United States Patent [19]
Nilsson

[11] 3,850,046
[45] Nov. 26, 1974

[54] BALL NUT SCREW

[75] Inventor: Sven Walter Nilsson, Partille, Sweden

[73] Assignee: SKF Industrial Trading and Development Company B.V., Amsterdam, Netherlands

[22] Filed: Apr. 5, 1973

[21] Appl. No.: 348,138

[30] Foreign Application Priority Data
Apr. 17, 1972 Sweden.............................. 5050/72

[52] U.S. Cl. .............................................. 74/459
[51] Int. Cl............................................ F16h 55/22
[58] Field of Search...................................... 74/459

[56] References Cited
UNITED STATES PATENTS

| | | | |
|---|---|---|---|
| 1,565,805 | 12/1925 | Jones.................................. | 74/459 |
| 2,855,792 | 10/1958 | Gates.................................. | 74/459 |
| 3,306,124 | 2/1967 | Adams................................. | 74/459 |

FOREIGN PATENTS OR APPLICATIONS
627,365   8/1949   Great Britain........................ 74/459

*Primary Examiner*—Leonard H. Gerin
*Attorney, Agent, or Firm*—Howson and Howson

[57] ABSTRACT

A ball nut screw assembly comprising a screw member, a nut member circumscribing said screw member, means defining a ball path between said screw and nut members, balls engageable in said ball path, means defining a groove in the outer peripheral surface of said nut member terminating at opposite ends in bores communicating with said ball path, a recirculation member including an elongated roof shaped portion completely recessed in said groove and forming therewith a recirculation channel and cylindrical portions at opposite ends of said roof shaped portion engageable in said bores and extending towards said ball path, and means integral with said nut member for securing said recirculation member to said nut member.

6 Claims, 5 Drawing Figures

PATENTED NOV 26 1974

3,850,046

BALL NUT SCREW

The present invention relates to a device for re-circulation of balls in ball nut screws of the kind comprising a nut with an internally thread-shaped groove and a screw with an in a corresponding manner shaped external groove and a number of balls arranged between said elements for co-operation with each other.

When the mechanism is in motion the balls shall be recirculated as nut/screw move in relationship to each other.

In the ball nut screw mechanisms hitherto known the recirculation is arranged in such a manner that the ball which is to be recirculated is picked up from the ball path by the aid of a deflection finger arranged in the nut portion after which the ball is transferred in a recirculation passage which could be shaped as a canal in the proper nut portion or a tube arranged outside the mechanism.

Such re-circulation devices for the balls are relatively expensive in manufacturing and complicated to mount.

The purpose of the present invention is to obtain a very simple but well functioning re-circulation system for the balls which also is very cheap in manufacturing.

Figure 1:
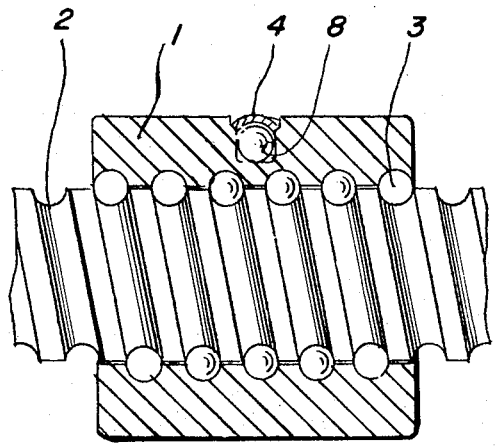
Figure 2:
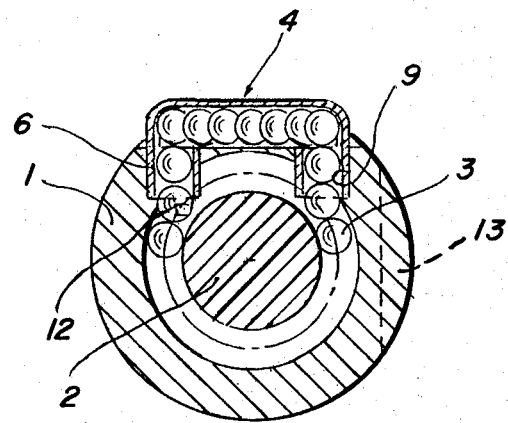
Figure 4:
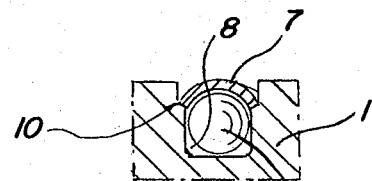
Figure 5:
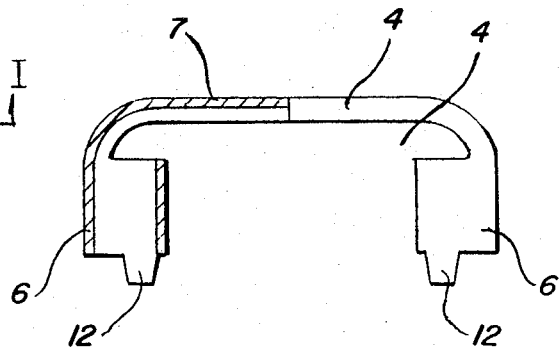

The invention will now be described with reference to the accompanying drawing in which FIG. 1 illustrates a longitudinal section of a ball nut screw in accordance with the invention cut along line I — I in FIG. 3 which shows an outer view of the ball nut screw seen from above. FIG. 2 shows a cross section of the ball nut screw along the line II — II in FIG. 3. FIG. 4 illustrates an enlarged part section of FIG. 1 and FIG. 5 shows the re-circulation device of the ball nut screw.

Figure 3:
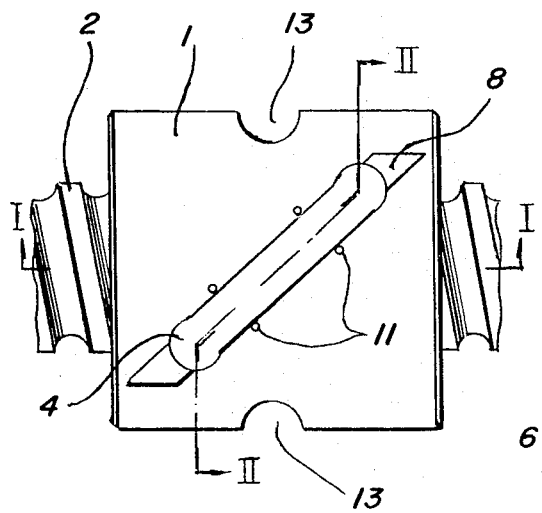

As mentioned in the preamble a ball nut screw of this kind comprises a nut portion 1, a screw 2 and a number of balls 3 which appears from FIGS. 1, 2 and 3. The re-circulation system which in present case has no deflection finger comprises an especially shaped re-circulation member 4 for the balls. As a basic blank for this member it is possible to use a piece of tube from which a part 5 is cut off, after which the end portions are turned at an angle of 90° so that two cylindrical portions 6 are formed, connected together by a roof-shaped part 7 (vide FIG. 5). The re-circulation member 4 is mounted to a milled groove 8 of the nut portion 1 with the cylindrical portions 6 fitted into bores 9 in the nut portion. As appears from FIG. 4 in the side walls of the groove 8 recesses 10 have been machined in which the side rims of the roof 7 of the re-circulation member 4 rest, where a retention is obtained so that the re-circulation member does not press towards the balls and thus prevents the re-circulation. The re-circulation member is fixed into the groove 8 by means of punchings 11 as indicated in FIG. 3.

When manufacturing the re-circulation member it could be possible instead of starting from a tube blank to start from a flat strip in which the roof 7 and the portions 6 are pressed to desired size in flat performance after which the strip is bent and turned so that the shape of the roof and the cylindrical portions is obtained. Of course there will be a small joint where the joining edges of the cylindrical portions are to be met, but this fact is an advantage as a resilience is obtained in the portions when the same are fitted into the bores 9 in the nut portion and therewith a further improved retention of the whole re-circulation member. In order to obtain a reliable pick-up of the balls from the ball path in the re-circulation canal 4 the re-circulation member could be provided with deflection tongues 12 which appears from FIGS. 2 and 5. In such a manner separate deflection fingers and complications in mounting the same in the mechanism are eliminated.

A ball nut screw in accordance with the invention is at first hand intended to be manufactured in small dimensions since there is a very great demand for such ball screws within for instance the automotive industry. In this case the ball screws are used to operate, i.e., windows, seats, roof hatches and so on. On such occasions when the screw is moving it is possible to secure the nut against rotation around its axis and also to make it force transmitting in axial direction by milling semicircular recesses 13 in the outer periphery of the nut portion - as shown in FIGS. 2 and 3 -in which a fork or pins of a fixing device rest. The form of these recesses could of course be varied so that the same have rectangular flat shape, dovetail shape or the like.

A ball nut screw of the kind above described could of course be used within many various technical and other fields and the invention is not tied to the above embodiment but could be varied in a number of ways within the scope of the following claims.

What is claimed is:

1. A ball nut screw assembly comprising a screw member, a nut member circumscribing said screw member, means defining a ball path between said screw and nut members, balls engageable in said ball path, means defining a groove in the outer peripheral surface of said nut member terminating at opposite ends in bores communicating with said ball path, a recirculation member including an elongated roof shaped portion completely recessed in said groove and forming therewith a recirculation channel and cylindrical portions at opposite ends of said roof shaped portion engage able in said bores and extending towards said ball path, and means integral with said nut member for securing said recirculation member to said nut member.

2. A ball nut screw assembly as claimed in claim 1 wherein each of said generally cylindrical portions at opposite ends of said roof shaped portion includes a deflection tongue at its outer extremities projecting into the ball path operable to facilitate recirculation of the balls through said channel.

3. A ball nut screw assembly as claimed in claim 1 wherein the recirculation member is secured to said nut member by upsetting a portion of the side wall defining said groove to engage the outer surface of said roof shaped portion at least at two locations adjacent opposite side edges thereof.

4. A ball nut screw assembly as claimed in claim 1 wherein the recirculation member is of one piece construction formed of a pressed steel strip to a shape defining said roof shaped portion and generally cylindrical portions.

5. A ball nut screw assembly as claimed in claim 1 wherein said roof shaped portion is of arcuate cross section and wherein said groove is a stepped configuration defining a shoulder against which the side edge portions of the roof shaped portion seats.

6. A ball nut screw assembly as claimed in claim 1 wherein said nut member is provided with means for mounting it against rotation about its axis and also force transmitting by recesses in the outer periphery of the nut portion in which mounting means are engaged.

* * * * *